United States Patent
Fuchs et al.

(10) Patent No.: US 8,843,277 B2
(45) Date of Patent: Sep. 23, 2014

(54) METHOD FOR OPERATING THE ON-BOARD ELECTRICAL POWER SYSTEM OF A MOTOR VEHICLE

(75) Inventors: Thorsten Fuchs, Hallstadt (DE); Matthias Hering, Forchheim (DE); Holger Wuerstlein, Zeil am Main (DE); Thomas Schindhelm, Neuhaus-Schierschnitz (DE); Detlef Russ, Ebersdorf (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 13/378,324

(22) PCT Filed: Feb. 23, 2011

(86) PCT No.: PCT/EP2011/000877
§ 371 (c)(1),
(2), (4) Date: Sep. 18, 2012

(87) PCT Pub. No.: WO2011/104012
PCT Pub. Date: Sep. 1, 2011

(65) Prior Publication Data
US 2013/0018551 A1 Jan. 17, 2013

(30) Foreign Application Priority Data
Feb. 23, 2010 (DE) .......................... 10 2010 009 058

(51) Int. Cl.
*B60R 22/00* (2006.01)
*G05B 19/00* (2006.01)
*B60R 25/00* (2013.01)
*E05F 15/20* (2006.01)
*E05F 15/00* (2006.01)

(52) U.S. Cl.
CPC ............. *B60R 25/00* (2013.01); *E05F 15/2023* (2013.01); *E05F 15/00* (2013.01); *E05Y 2400/852* (2013.01); *E05Y 2400/86* (2013.01); *E05Y 2400/858* (2013.01); *E05Y 2400/452* (2013.01); *E05Y 2900/546* (2013.01)
USPC ............................................ 701/49; 340/5.51

(58) Field of Classification Search
USPC .............................. 701/36, 49; 340/5.51, 5.72
See application file for complete search history.

(56) References Cited

U.S. PATENT DOCUMENTS 7,116,140 B2 * 10/2006 Koch ............................. 327/143
7,606,643 B2 * 10/2009 Hunt et al. ...................... 701/36

(Continued)

FOREIGN PATENT DOCUMENTS

DE 102004027541 12/2004
DE 102004027541 A1 * 12/2004 .............. B60R 25/00

(Continued)

*Primary Examiner* — Thomas G Black
*Assistant Examiner* — Tyler Paige
(74) *Attorney, Agent, or Firm* — Pauly, Devries, Smith & Deffner, LLC

(57) ABSTRACT

A method for operating the electrical system of a motor vehicle having a control unit with an operating mode and an energy-saving standby mode is described. A wake-up operator control event is detected by a sensor and has an associated time interval from the preceding wake-up operator control event. The time interval is ascertained when a wake-up operator control event is detected, and the control unit is woken up or not woken up. Each wake-up operator control event has an associated switch-off indicator which is ascertained each time a wake-up operator control event is detected, and the control unit is woken up or not woken up as a function of the level of the switch-off indicator with reference to a switch-off threshold. A change in the current switch-off indicator relative to the preceding switch-off indicator is all the greater the smaller the current time interval.

20 Claims, 2 Drawing Sheets

(56) References Cited

U.S. PATENT DOCUMENTS

| | | | |
|---|---|---|---|
| 8,350,669 B2 * | 1/2013 | Magner et al. | 340/5.72 |
| 2005/0034023 A1 * | 2/2005 | Maturana et al. | 714/37 |
| 2007/0250220 A1 * | 10/2007 | Hunt et al. | 701/1 |
| 2008/0307240 A1 * | 12/2008 | Dahan et al. | 713/320 |
| 2009/0164072 A1 * | 6/2009 | Vaysse et al. | 701/49 |
| 2010/0207722 A1 * | 8/2010 | Rutledge | 340/5.51 |
| 2010/0321173 A1 * | 12/2010 | Magner et al. | 340/426.1 |
| 2011/0270452 A1 * | 11/2011 | Lu et al. | 700/291 |
| 2013/0018551 A1 * | 1/2013 | Fuchs et al. | 701/49 |
| 2013/0131917 A1 * | 5/2013 | Fuchs et al. | 701/36 |

FOREIGN PATENT DOCUMENTS

| | | | |
|---|---|---|---|
| DE | 10333894 | 2/2005 | |
| DE | 10333894 A1 * | 2/2005 | ............. B60R 25/00 |
| DE | 102008063366 | 7/2010 | |
| DE | 102008063366 A1 * | 7/2010 | ............. E05B 65/20 |
| EP | 1158122 | 11/2001 | |
| EP | 1699018 | 9/2006 | |
| EP | 1902912 | 3/2008 | |
| WO | 2006/015418 | 2/2006 | |
| WO | 2011/104012 | 9/2011 | |

\* cited by examiner

METHOD FOR OPERATING THE ON-BOARD ELECTRICAL POWER SYSTEM OF A MOTOR VEHICLE

CROSS-REFERENCE TO RELATED APPLICATIONS

This application is a national stage application under 35 U.S.C. 371 of International Patent Application Serial No. PCT/EP2011/000877, entitled "METHOD FOR OPERATING THE ON-BOARD ELECTRICAL SYSTEM OF A MOTOR VEHICLE," filed Feb. 23, 2011, which claims priority from German Patent Application No. 10 2010 009 058.1, filed Feb. 23, 2010, the disclosures of which are incorporated herein by reference.

FIELD OF THE INVENTION

The invention relates to a method for operating the on-board electrical system of a motor vehicle, and to a motor vehicle having an on-board electrical system, in particular for carrying out said method.

BACKGROUND

The on-board electrical systems of modern motor vehicles are equipped with a large number of electrical loads which serve mainly to implement convenience and comfort functions. Depending on the load, the energy consumption by such on-board systems can be considerable even in standby mode, this possibly leading to complete discharge of the vehicle battery in a worst-case scenario. In this case, energy consumption by the bus system of the on-board system plays a particular role in addition to energy consumption by the individual electrical loads. Modern bus systems are specifically generally designed such that wake up of a load is accompanied by wake up of the entire bus system, this significantly increasing energy consumption.

One of the above convenience or comfort functions is the so-called "keyless entry function". Known keyless entry systems share the common feature that an, in particular radio-based, authentication dialog is provided between a motor vehicle-side keyless entry control unit and a user-side radio key or the like in order to check the access authorization of the user. After a successful authentication dialog and possibly further operator control events, the motor vehicle is unlocked and/or, depending on the design, a hatch or the like is operated in a motorized manner.

A known arrangement having a keyless entry function (DE 103 33 894 A1) makes provision for the keyless entry control unit to be permanently or cyclically checked in order to determine whether a radio key for the authentication dialog is present. Since this process is associated with correspondingly permanent or cyclical discharging of the vehicle battery, it is proposed to provide an additional energy storage means for the keyless entry function.

In order to reduce energy consumption by the on-board system of a motor vehicle, it has also been proposed to at least temporarily switch over the control unit to an energy-saving standby mode and to wake up said control unit into an operating mode as the situation requires (DE 10 2004 027 541 A1). One requirement for this method which represents the starting point for the present invention is correct switching between the standby mode and the operating mode, specifically in such a way that the respectively desired function is not adversely affected and the system is not susceptible to external influences or misuse.

SUMMARY OF THE INVENTION

The invention is based on the problem of developing the known method for operating the on-board system of a motor vehicle in such a way that the control unit is switched over to the standby mode and the operating mode without adversely affecting functioning and with a high degree of robustness to external influences or misuse.

In the case of a method for operating the on-board electrical system of a motor vehicle having a control unit, which is designed in particular as a keyless entry control unit, it being possible to wake up the control unit into an operating mode starting from an energy-saving standby mode, the above problem is solved by a predetermined wake-up operator control event ($B_n$), in particular a person approaching, being detected by means of a sensor arrangement, wherein each wake-up operator control event ($B_n$) has an associated time interval ($\Delta t_n$) from the respectively preceding wake-up operator control event ($B_{n-1}$), wherein the associated time interval ($\Delta t_n$) is ascertained when a wake-up operator control event ($B_n$) is detected, and the control unit is woken up or not woken up as a function of the time interval ($\Delta t_n$), wherein each wake-up operator control event ($B_n$) has an associated switch-off indicator ($A_n$) which is ascertained each time a wake-up operator control event ($B_n$) is detected based on the time interval ($\Delta t_n$) of said wake-up operator control event, and wherein the control unit is woken up or not woken up as a function of the level of the switch-off indicator ($A_n$) with reference to a switch-off threshold ($S_o$), and in that a change in the current switch-off indicator ($A_n$) relative to the preceding switch-off indicator ($A_{n-1}$) in the direction of the switch-off threshold ($S_o$) is all the greater the smaller the current time interval ($\Delta t_n$).

It is important, in the first instance, for a predetermined wake-up operator control event, in particular a person approaching, to be detected by means of a sensor arrangement. This allows, in principle, the control unit to be woken up in a manner which is not noticed by the user, as the situation requires However, there is a risk here of the possibility of wake-up operator control events being "generated" and detected by the sensor arrangement accidently or by misuse. One example of this are playing children who repeat the above wake-up operator control event several times, so that the control unit, and as a result the bus system of the on-board system, are woken up several times in an undesirable manner. Branches or the like which move in the wind can cause a similar effect if they are detected by the sensor arrangement.

The above external influences which are incorrectly identified as wake-up operator control events share the common feature that they lead to incorrect detection of several wake-up operator control events within brief intervals.

The probability of the control unit actually intending to be woken up can therefore be identified in the time intervals between the respective wake-up operator control events. It is therefore proposed that each detected wake-up operator control event has an associated time interval from the respectively preceding wake-up operator control event, said associated time interval being ascertained when an operator control event is detected. The control unit is finally woken up or not woken up as a function of the time interval. Undesired wake up of the control unit on account of external influences can be considerably reduced by the solution according to the proposal.

The solution according to the proposal exhibits a method which is particularly easy to implement and in which each wake-up operator control event has a specific associated value—switch-off indicator—which, with reference to a switch-off threshold, predefines whether the control unit should be woken up or even not woken up.

The solution according to the proposal also ensures that, in particular, short time intervals lead to a change in the switch-off indicator in the direction of the switch-off threshold, and that this change is all the greater the smaller the current time interval. This is accounted for by the fact that several wake-up operator control events which follow one another at short time intervals are highly improbable in the case of operator control in accordance with normal operation.

The further preferred refinements relate to ascertaining the switch-off indicator from the time intervals over a series of detected wake-up operator control events. Therefore, the level of the switch-off indicators can be controlled as a function of the time intervals of a series of preceding wake-up operator control events.

According to a further teaching which is likewise significant on its own, the above problem is solved, in the case of a motor vehicle having an on-board electrical system with the on-board system having a control unit, which is designed in particular as a keyless entry control unit, it being possible to wake up the control unit into an operating mode starting from an energy-saving standby mode, by having a predetermined wake-up operator control event, in particular a person approaching, detected by means of a sensor arrangement, wherein each wake-up operator control event ($B_n$) has an associated time interval ($\Delta t_n$) from the respectively preceding wake-up operator control event ($B_{n-1}$), wherein the arrangement is made such that the associated time interval ($\Delta t_n$) is ascertained when a wake-up operator control event ($B_n$) is detected, and the control unit is woken up or not woken up as a function of the time interval ($\Delta t_n$), in that each wake-up operator control event ($B_n$) has an associated switch-off indicator ($A_n$) which is ascertained each time a wake-up operator control event ($B_n$) is detected based on its time interval ($\Delta t_n$), and wherein the control unit is woken up or not woken up as a function of the level of the switch-off indicator ($A_n$) with reference to a switch-off threshold ($S_o$).

In this case too, it is important for the arrangement, in particular the on-board electrical system of the motor vehicle, to be made such that the associated time interval is ascertained when a wake-up operator control event is detected and the control unit is woken up or even not woken up as a function of the time interval. In order to explain this further teaching, reference may be made to all the embodiments relating to the method according to the proposal.

In one embodiment, the invention provides a method for operating the on-board electrical system of a motor vehicle having a control unit, which is designed in particular as a keyless entry control unit, it being possible to wake up the control unit into an operating mode starting from an energy-saving standby mode, wherein a predetermined wake-up operator control event ($B_n$), in particular a person approaching, is detected by means of a sensor arrangement, wherein each wake-up operator control event ($B_n$) has an associated time interval ($\Delta t_n$) from the respectively preceding wake-up operator control event ($B_{n-1}$), wherein the associated time interval ($\Delta t_n$) is ascertained when a wake-up operator control event ($B_n$) is detected, and the control unit (2) is woken up or not woken up as a function of the time interval ($\Delta t_n$), wherein each wake-up operator control event ($B_n$) has an associated switch-off indicator ($A_n$) which is ascertained each time a wake-up operator control event ($B_n$) is detected based on the time interval ($\Delta t_n$) of said wake-up operator control event, and wherein the control unit (2) is woken up or not woken up as a function of the level of the switch-off indicator ($A_n$) with reference to a switch-off threshold ($S_o$), and wherein a change in the current switch-off indicator ($A_n$) relative to the preceding switch-off indicator ($A_{n-1}$) in the direction of the switch-off threshold ($S_o$) is all the greater the smaller the current time interval ($\Delta t_n$).

In one embodiment, the on-board system has a bus system, and wherein wake up of the control unit is accompanied by at least partial, preferably complete, wake up of the bus system.

In another embodiment, wake up of the control unit triggers an, in particular radio-based, authentication dialog with a radio key of the user, and preferably wherein after a successful authentication dialog and, possibly after the detection of a further operator control event by the sensor arrangement, a hatch, in particular a tailgate, of the motor vehicle is opened in a motorized manner.

In one embodiment, a change in the current switch-off indicator ($A_n$) relative to the preceding switch-off indicator ($A_{n-1}$) in the direction of the switch-off threshold ($S_o$) results only when the current time interval ($\Delta t_n$) is below a nominal time interval ($\Delta t_{nom}$).

In one embodiment, the switch-off indicator ($A_n$) is ascertained from the time intervals ($\Delta t_n$) over a series of detected wake-up operator control events ($B_n$) which ends in the current wake-up operator control event ($B_n$).

In one embodiment, the switch-off indicator ($A_n$) results from the sum of, in particular weighted, time interval value numbers over a series of detected wake-up operator control events ($B_n$) which ends in the current wake-up operator control event ($B_n$), preferably wherein the time interval value numbers each result from the difference between a nominal time interval ($\Delta t_{nom}$) and the respectively ascertained time interval ($\Delta t_n$), or wherein the time interval value numbers are the ascertained time intervals ($\Delta t_n$) themselves. In one embodiment, at least one weighting factor is constant, or wherein at least one weighting factor is variable.

In one embodiment, the switch-off indicator ($A_n$) is ascertained in an iterative manner, and wherein each detection of a wake-up operator control event ($B_n$) forms an iteration step, in particular a summation step, for forming the sum which forms the switch-off indicator ($A_n$).

In one embodiment, the switch-off indicator ($A_n$) is reset to a predetermined value after a reset condition is detected, preferably wherein the reset condition is initiation of the driving operation, authentication of the user, unlocking of the motor vehicle or detection of a predetermined operator control pattern.

In one embodiment, the sensitivity of the sensor arrangement is varied as a function of the switch-off indicator ($A_n$), preferably wherein the sensitivity is greater the further away the switch-of indicator ($A_n$) is from the switch-off threshold ($S_o$).

In another embodiment, the invention provides a motor vehicle having an on-board electrical system, in particular for carrying out the method as claimed in one of the preceding claims, with the on-board system having a control unit, which is designed in particular as a keyless entry control unit, it being possible to wake up the control unit into an operating mode starting from an energy-saving standby mode, wherein a predetermined wake-up operator control event, in particular a person approaching, can be detected by means of a sensor arrangement, wherein each wake-up operator control event ($B_n$) has an associated time interval ($\Delta t_n$) from the respectively preceding wake-up operator control event ($B_{n-1}$), wherein the arrangement is made such that the associated time interval ($\Delta t_n$) is ascertained when a wake-up operator control event ($B_n$) is detected, and the control unit is woken up or not woken up as a function of the time interval ($\Delta t_n$), wherein each wake-up operator control event ($B_n$) has an associated switch-off indicator ($A_n$) which is ascertained each time a wake-up operator control event ($B_n$) is detected based on its time interval ($\Delta t_n$), and wherein the control unit is woken up or not woken up as a function of the level of the switch-off indicator ($A_n$) with reference to a switch-off threshold ($S_o$).

In one embodiment, wake up of the control unit triggers a radio-based authentication dialog with a radio key of the user, and preferably wherein the motor vehicle has a door or hatch, in particular a tailgate, said door or hatch having an associated door or hatch drive, and wherein, after a successful authentication dialog and possibly after the detection of a further operator control event by the sensor arrangement, a hatch, in particular a tailgate, of the motor vehicle is opened in a motorized manner.

BRIEF DESCRIPTION OF THE FIGURES

The invention will be explained in greater detail below with reference to a drawing which illustrates just one exemplary embodiment and in which.

DETAILED DESCRIPTION

The method according to the proposal describes the operation of the on-board electrical system of a motor vehicle 1 having a control unit 2 which is designed here and preferably as a keyless entry control unit. A keyless entry control unit 2 of this kind comprises all components which are required for implementing an authentication dialog.

In this context, the term "control unit" is to be understood in broad terms and can also comprise only parts of an inherently closed control system. In this case, it is important for it to be possible for the control unit 2 to be woken up into an operating mode starting from an energy-saving standby mode. The standby mode can also simply be the switched-off state of the control unit 2. In the case of the keyless entry control unit, wake up into the operating mode generally means that the authentication dialog is started.

The control unit 2 has an associated predetermined wake-up operator control event B which is detected by means of a sensor arrangement 3 and which can wake up the control unit 2 given specific boundary conditions. Depending on the design of the sensor arrangement 3, the wake-up operator control event B may be a person approaching in order to operate a door handle or the like.

This document always refers to the operator control event B. Therefore, the n-th wake-up operator control event B is meant in a series of wake-up operator control events B which are detected by the sensor arrangement 3.

Now, it is important that each wake-up operator control event $B_n$ has an associated time interval $\Delta t_n$ from each respectively preceding wake-up operator control event $B_{n-1}$. When a wake-up operator control event $B_n$ is detected, the associated time interval $\Delta t_n$ is ascertained, with the control unit 2 being woken up or not woken up as a function of the time interval $\Delta t_n$.

Figure 1:
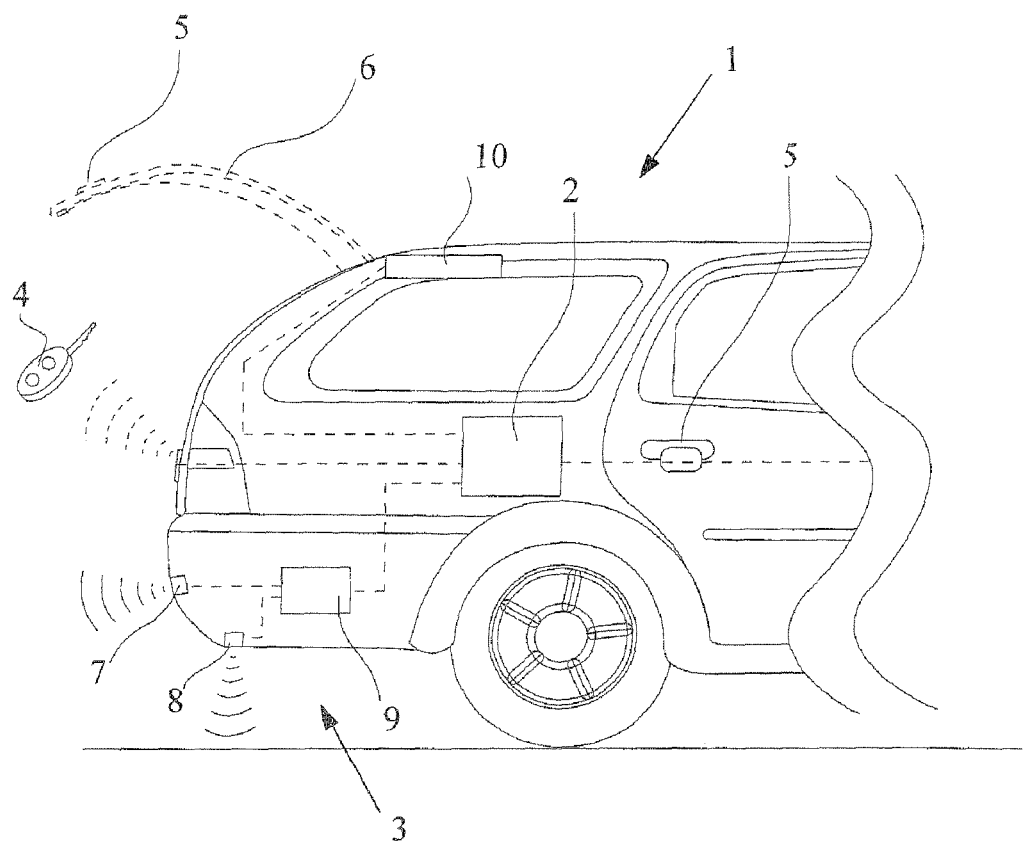
FIG. 1 shows the tailgate of a motor vehicle according to the proposal for carrying out the method according to the proposal.

In this case, and preferably, the on-board system of the motor vehicle is equipped with a bus system which allows a wide variety of electrical components of the motor vehicle to be linked. The control unit 2 is preferably also linked to the bus system of the motor vehicle. In this respect, the connections illustrated in FIG. 1 are to be understood to be merely schematic and function-based. In fact, these connections are routinely realized via the bus system. Wake up of the control unit 2 is accordingly accompanied by at least partial, in particular complete, wake up of the bus system. The method according to the proposal exhibits particularly significant advantages in respect of the energy requirement associated with wake up of the bus system.

As already discussed above, the control unit 2 is here and preferably designed as a keyless entry control unit. Wake up of the control unit 2 accordingly triggers an, in particular radio-based, authentication dialog with a radio key 4 of the user. To this end, the control unit 2 has an associated antenna arrangement (not illustrated) which are preferably accommodated in the external door handles 5 of the motor vehicle.

After a successful authentication dialog and possibly after the detection of a further operator control event by the sensor arrangement 3, a hatch, here the tailgate 6 of the motor vehicle 1, is opened in a motorized manner. A preferred variant for the further operator control event will be explained further below.

Each wake-up operator control event $B_n$ has an associated specific value—switch-off indictor $A_n$—which is ascertained each time a wake-up operator control event $B_n$ is detected based on the time interval $\Delta t_n$ of said wake-up operator control event, with the control unit 2 being woken up or even not woken up in the above sense as a function of the level of the switch-off indicator $A_n$ with reference to a switch-off threshold $S_o$.

Figure 2:
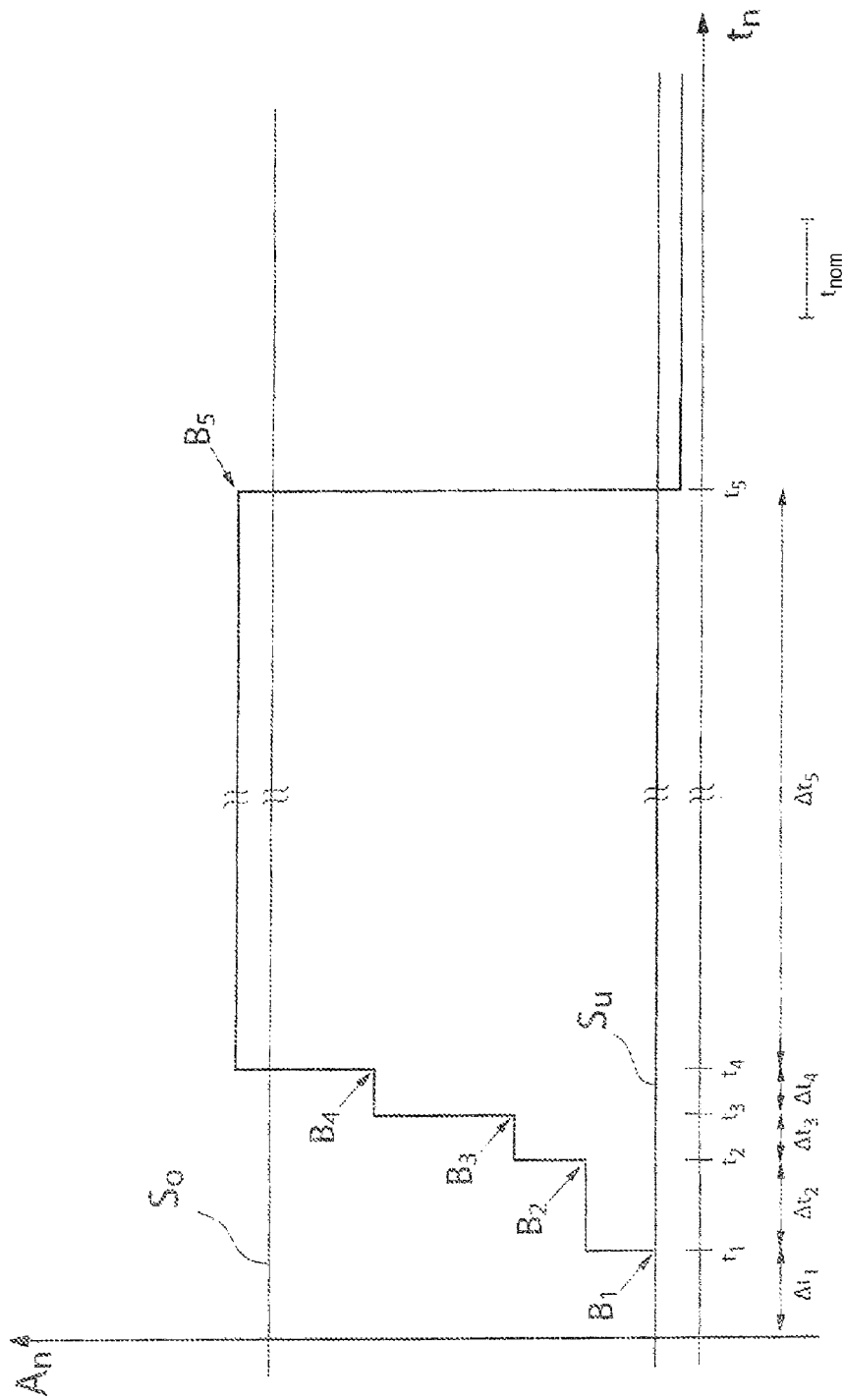
FIG. 2 shows an exemplary time profile of the switch-off indicator in accordance with the method according to the proposal.

FIG. 2 shows an exemplary profile of the switch-off indicator $A_n$ with a total of five wake-up operator control events $B_1$-$B_5$. It is already clear from this illustration that the level of the switch-off indicator $A_n$ depends—in each case also—on the associated time interval $\Delta t_n$.

Provision is made, here and preferably, for the control unit 2 to be woken up out of the normal mode when a wake-up operator control event $B_n$ is detected, provided that the switch-off indicator $A_n$ remains below the switch-off threshold $S_o$. In the case of the profile illustrated in FIG. 2, this means that the control unit 2 is no longer woken up (switch-off mode) when the fourth wake-up operator control event $B_4$ is detected.

FIG. 2 also illustrates a lower switching threshold $S_u$, the control unit 2 being woken up when said lower threshold is undershot out of the switch-off mode. Therefore, a certain hysteresis can be produced in respect of the switching behavior. However, the lower switching threshold $S_u$ can also be dispensed with given specific boundary conditions.

As a function of the current time interval $\Delta t_n$, the current switch-off indicator $A_n$ experiences a change in the direction of the switch-off threshold $S_o$ or a change away from the switch-off threshold $S_o$ relative to the preceding switch-off indicator $A_{n-1}$ during normal operation. According to FIG. 2, a change in the direction of the switch-off threshold $S_o$ is, here and preferably, an increase in the switch-off indicator $A_n$.

The abovementioned change in direction of the switch-off indicator $A_n$ depends, as discussed, on the current time interval $\Delta t_n$. To this end, a nominal time interval $\Delta t_{nom}$ is defined, this returning, for example, to the average time interval $\Delta t_n$ during normal operation. If the current time interval $\Delta t_n$ is now below the nominal time interval $\Delta t_{nom}$, detection of the wake-up operator control event $B_n$ returns with some probability to an undesired wake-up operator control event, so that the switch-off indicator $A_n$ is changed, here increased, in the direction of the switch-off threshold $S_o$. Otherwise, the switch-off indicator $A_n$ is accordingly reduced. The nominal time interval $\Delta t_{nom}$ may also be a variable which is changed, in particular matched to the use behavior of the current user, in particular automatically, at regular intervals.

The illustration in FIG. 2 also shows that a change in the current switch-off indicator $A_n$ relative to the preceding switch-off indicator $A_{n-1}$ in the direction of the switch-off threshold $A_o$ is all the greater the smaller the current time interval $\Delta t_n$. This is shown in FIG. 2, for example, by comparison of the wake-up operator control event $B_2$ and the wake-up operator control event $B_3$. The wake-up operator control event $B_2$ has the associated time interval $\Delta t_2$ and the wake-up operator control event $B_3$ has the associated time interval $\Delta t_3$. Since the time interval $\Delta t_2$ is greater than the time interval $\Delta t_3$, the change in the switch-off indicator $A_n$ at time $t_2$ is smaller than at time $t_3$. This means nothing other than that the switch-off indicator $A_n$ reaches the switch-off threshold $S_o$ in fewer wake-up operator control events $B_n$ in the case of shorter time intervals $\Delta t_n$, so that the vehicle battery is only slightly loaded by this detection which is incorrect with some probability.

In a particularly preferred refinement, the switch-off indicator $A_n$ is ascertained from the time intervals $\Delta t_n$ over a series of detected wake-up operator control events $B_n$ which ends in the current wake-up operator control event $B_n$.

The switch-off indicator $A_n$ preferably results from the sum of weighted time interval value numbers over an above-mentioned series of detected wake-up operator control events $B_n$ which ends in the current wake-up operator control event $B_n$. In this case, provision may be made for the time interval value numbers to be produced in each case by the difference between the nominal time interval $\Delta t_{nom}$ and the respectively ascertained time interval $\Delta t_n$, or for the time interval value numbers to be the ascertained time intervals $\Delta t_n$ themselves. In a particularly preferred refinement, the following mathematical function is produced to $$A_n = \sum_{i=i_0}^{n} a_{ABST}(\Delta t_{nom} - \Delta t_i) a_{STNDZ} \cdot T_i$$

describe the switch-off indicator $A_n$:

According to the above definition of the switch-off indicator $A_n$, the time interval value numbers are in each case the difference between the nominal time interval $\Delta t_{nom}$ and the respectively ascertained time interval $\Delta t$. This time interval value number has the associated optional weighting factor $a_{ABST}$ which can be a constant factor, a function of the respective time interval $\Delta t_n$ or the like. Very generally, the weighting factors which are associated with the time interval value numbers can be constant or else variable.

A further optionally provided weighting factor $a_{STNDZ}$ is a weighting factor for the service life $T_n$ of the motor vehicle which corresponds, in particular, to the time period between the time at which the motor vehicle 1 is turned off and the time of the current wake-up operator control event $B_n$. As an alternative to the service life $T_n$, the bus sleep time period of the bus which is associated with the control unit 2 can be used.

The weighting factor $a_{STNDZ}$ can again be a constant factor, or else a function of the service life, the time interval $\Delta t_n$ or the like.

The above mathematical function for the switch-off indicator $A_n$ shows that the switch-off indicator $A_n$ can be easily ascertained in an iterative manner by each detection of a wake-up operator control event $B_n$ forming an iteration step, in particular an above-mentioned summation step for forming the sum which forms the switch-off indicator $A_n$. In this case, the current switch-off indicator $A_n$ is formed by a change (discussed further above) in the preceding switch-off indicator $A_{n-1}$ each time a wake-up operator control event $B_n$ is detected. This can be implemented in a particularly simple manner. However, it is also feasible for the time intervals $\Delta t_n$ of the series of wake-up operator control events $B_n$ in question to be stored and for the above sum to be accordingly recalculated with each new detection operation.

With the method according to the proposal, it is possible to react quickly to an expected incorrect detection of wake-up operator control events which have been generated by accident or misuse, by wake up of the control unit 2 being suppressed after only a few detected wake-up operator control events $B_n$. Normal operation is also rapidly re-established in the event of subsequent use according to normal operation given a corresponding design.

However, in some cases, it is necessary to be able to move from the switch-off mode back to the normal mode preferably without any delay. This can be achieved, inter alia, by the switch-off indicator $A_n$ being reset to a predetermined value after a predetermined reset condition is detected.

For example, the above reset condition may be initiation of the driving operation, successful authentication of the user, unlocking of the motor vehicle or detection of a predetermined operator control pattern. A predetermined operator control pattern of this kind could comprise, for example, two immediately successive wake-up operator control events $B_n$. This accounts for the user reflexively carrying out a second wake-up operator control event $B_n$ after a first, unsuccessful attempt to carry out wake-up operator control event $B_n$. This operator control pattern with exactly two successive wake-up operator control events $B_n$ can be easily detected by control technology. In this special case, the switch-off indicator is reset and not, as explained above, ascertained again in an iteration step.

In the illustrated and in this respect preferred exemplary embodiment, the switch-off mode is set, as explained, as soon as the switch-off indicator $A_n$ reaches the threshold $S_o$. A further increase in the switch-off indicator $A_n$ out of the switch-off mode is preferably blocked. This prevents the switch-off indicator $A_n$ rising beyond a predetermined value. In the case of an excessive increase of this kind, it would hardly be possible to reach the threshold $S_u$ any longer in some cases, specifically without a reset process. Accordingly, provision is preferably made for the switch-off indicator $A_n$ to not fall below a predetermined value.

A particularly preferred refinement with which the probability of the undesired wake up of the control unit 2 can be further reduced is adapting the sensitivity of the sensor arrangement 3 to the level of the respectively ascertained switch-off indicator. This can be shown in a simplified manner as follows:

$$S_{sens} = S_{max} - a_{switch-off\,ind} \cdot A_n$$

The sensitivity $S_{sens}$ is given here by the difference between the maximum possible sensitivity $S_{max}$ and the weighted switch-off indicator. In this case, the weighting factor $a_{switch-off\,ind}$ can be a constant factor or a function of the switch-off indicator, the current time interval or the like. In this case, the fact that the sensitivity is all the greater the further away the switch-off indicator $A_n$ is from the switch-off threshold $S_o$ is important here.

Reference can be made to the fact that numerous advantageous variants of the wake-up operator control event $B_n$ are feasible. This is true primarily of the motor vehicle (illustrated in FIG. 1) having the sensor arrangement 3 there. The sensor arrangement 3 has two electrodes 7, 8, with one electrode 7 being directed toward the rear and the other electrode 8 being directed downward. It is therefore possible for people and objects behind and beneath the hatch region of the motor vehicle 1 to be detected by sensor. Both electrodes 7, 8 are connected to a sensor control system 9 which is in turn connected to the control unit 2. Here and preferably, the control unit 2 is connected to a superordinate motor vehicle control system (not illustrated). It goes without saying that numerous variants are possible in respect of the control system structure.

Here and preferably, the motor vehicle 1 is additionally equipped with a hatch drive 10 which allows the tailgate 6 to be opened and closed in a motorized manner.

The basic operator control method in the case of the illustrated motor vehicle for opening the tailgate 6 can now comprise the motorized operation of the tailgate 6 being initiated by a foot movement of the user which is detected by the sensor arrangement 3. This foot movement may be, for example, a forward movement or a forward/backward movement. Other types of movement are feasible.

Before motorized operation of the tailgate 6, an abovementioned wake-up operator control event $B_n$ which, here and preferably, starts the authentication dialog has to be detected.

The wake-up operator control event $B_n$ may be the user approaching the motor vehicle 1, it being possible for this to be detected by means of the upper electrode 7. This is then preferably followed by a further operator control event, as discussed above, for example an abovementioned foot movement of the user which triggers motorized operation of the tailgate 6.

However, it is also feasible for the forward movement of a foot of the user to be detected as a wake-up operator control event $B_n$ A forward movement of this kind can be best effected by combined detection by both electrodes 7, 8. Finally, it is feasible for the forward and backward movement of a foot of the user, which movement is once again detected best by the two electrodes 7, 8, to represent the above wake-up operator control event B.

According to a further teaching, which is likewise significant on its own, a motor vehicle 1 as such is claimed. The motor vehicle 1 according to this further teaching is equipped with an on-board electrical system which is suitable, in particular, for carrying out the method according to the proposal.

The on-board system has a control unit 2 of the kind discussed above which is designed, in particular, as a keyless entry control unit, it being possible to wake up the control unit 2 into an operating mode starting from an energy-saving standby mode, and it being possible to detect a predetermined wake-up operator control event $B_n$, in particular a person approaching, by means of a sensor arrangement 3.

According to the further teaching, in accordance with the method according to the proposal, each wake-up operator control event $B_n$ has an associated time interval $\Delta t_n$ from the respectively preceding wake-up operator control event $B_{n-1}$ and the arrangement is made such that the associated time interval $\Delta t_n$ is ascertained when a wake-up operator control event $B_n$ is detected, and the control unit 2 is woken up or not woken up as a function of the time interval $\Delta t_n$.

In a preferred refinement, wake up of the control unit 2 triggers a radio-based authentication dialog with a radio key 4 of the user. In a further preferred refinement, the motor vehicle 1 has a door or hatch, in particular a tailgate 6, which has an associated door or hatch drive 10. After a successful authentication dialog or possibly after detection of a further operator control event $B_n$ by the sensor arrangement 3, the tailgate 6 of the motor vehicle 1 is opened in a motorized manner.

Reference can be made to all the above embodiments relating to the method according to the proposal which are suitable for describing the motor vehicle 1 according to this further teaching.

The invention claimed is:

1. A method for operating an on-board electrical system of a motor vehicle having a control unit comprising,
waking up the control unit into an operating mode starting from an energy saving standby mode, wherein a predetermined wake-up operator control event, is detected by means of a sensor arrangement, wherein each wake-up operator control event has an associated time interval from a preceding wake-up operator control event, wherein the associated time interval is ascertained when a wake-up operator control event is detected, and the control unit is woken up or not woken up as a function of the time interval, wherein each wake-up operator control event has an associated switch-off indicator which is ascertained each time a wake-up operator control event is detected based on the time interval of said wake-up operator control event, and wherein the control unit is woken up or not woken up as a function of a level of the switch-off indicator with reference to a switch-off threshold, and wherein a change in a current switch-off indicator relative to a preceding switch-off indicator in a direction of the switch-off threshold is greater the smaller the current time interval.

2. The method as claimed in claim 1, wherein the on-board system has a bus system, and wake up of the control unit is accompanied by at least partial, wake up of the bus system.

3. The method as claimed in claim 2, wherein wake up of the control unit is accompanied by complete wake up of the bus system.

4. The method as claimed in claim 1, wherein wake up of the control unit triggers an authentication dialog with a radio key of the user, and after a successful authentication dialog and, a hatch, of the motor vehicle is opened in a motorized manner.

5. The method as claimed in claim 4, wherein a change in the current switch-off indicator relative to the preceding switch-off indicator in the direction of the switch-off threshold results only when the current time interval is below a nominal time interval.

6. The method as claimed in claim 4, wherein the hatch is opened after detection of a further operator control event by the sensor arrangement.

7. The method as claimed in claim 1, wherein the switch-off indicator is ascertained from the time intervals over a series of detected wake-up operator control events which ends in the current wake-up operator control event.

8. The method as claimed in claim 1, wherein the switch-off indicator results from the sum of time interval value numbers over a series of detected wake-up operator control events which ends in the current wake-up operator control event.

9. The method as claimed in claim 8, wherein the sum of time interval value members over a series of detected wake-up operator control events is weighted.

10. The method as claimed in claim 9, wherein at least one weighting factor is constant, or at least one weighting factor is variable.

11. The method as claimed in claim 8, wherein the time interval value numbers each result from the difference between a nominal time interval and the respectively ascertained time interval, or in that the time interval value numbers are the ascertained time intervals themselves.

12. The method as claimed in claim 1, wherein the switch-off indicator is ascertained in an iterative manner, and each detection of a wake-up operator control event forms an iteration step, for forming the sum which forms the switch-off indicator.

13. The method as claimed in claim 12, wherein the iteration step is a summation step.

14. The method as claimed in claim 1, wherein the switch-off indicator is reset to a predetermined value after a reset condition is detected.

15. The method as claimed in claim 14, wherein the reset condition is initiation of a driving operation, authentication of the user, unlocking of the motor vehicle or detection of a predetermined operator control pattern.

16. The method as claimed in claim 1, wherein the sensitivity of the sensor arrangement is varied as a function of the switch-off indicator.

17. The method as claimed in claim 1, wherein the control unit is a keyless entry control unit.

18. The method as claimed in claim 1, wherein the predetermined wake-up operator control event comprises a person approaching.

19. A motor vehicle having an on-board electrical system having a control unit, it being possible to wake up the control unit into an operating mode starting from an energy-saving standby mode, wherein a predetermined wake-up operator control event, can be detected by means of a sensor arrangement, wherein each wake-up operator control event has an associated time interval from the respectively preceding wake-up operator control event, wherein the arrangement is made such that the associated time interval is ascertained when a wake-up operator control event is detected, and the control unit is woken up or not woken up as a function of the time interval, wherein each wake-up operator control event has an associated switch-off indicator which is ascertained each time a wake-up operator control event is detected based on its time interval, and wherein the control unit is woken up or not woken up as a function of the level of the switch-off indicator with reference to a switch-off threshold.

20. The motor vehicle as claimed in claim 19, wherein wake up of the control unit triggers a radio-based authentication dialog with a radio key of the user, and the motor vehicle has a door or hatch having an associated door or hatch drive, wherein, after a successful authentication dialog a door or hatch of the motor vehicle is opened in a motorized manner.

* * * * *